No. 748,797. PATENTED JAN. 5, 1904.
A. SCHWIEGER.
SPRING TIRE FOR VEHICLES.
APPLICATION FILED APR. 2, 1903.

NO MODEL.

Witnesses

Inventor

No. 748,797. Patented January 5, 1904.

UNITED STATES PATENT OFFICE.

ADOLF SCHWIEGER, OF HANOVER, GERMANY, ASSIGNOR TO JOSEPH GRAWI, OF HANOVER, GERMANY.

SPRING-TIRE FOR VEHICLES.

SPECIFICATION forming part of Letters Patent No. 748,797, dated January 5, 1904.

Application filed April 2, 1903. Serial No. 150,756. (No model.)

*To all whom it may concern:*

Be it known that I, ADOLF SCHWIEGER, a subject of the King of Prussia, German Emperor, and a resident of No. 38 Georgstrasse, Hanover, in the Empire of Germany, have invented new and useful Improvements in Spring-Tires for Cycles and Similar Vehicles, of which the following is a specification.

The present invention relates to improvements in spring-tires for cycles and similar vehicles, and more particularly it refers to that class of tires which is composed of a plurality of springs and provided with tensioning means for the springs.

The present tire possesses the advantage of greater durability, as same cannot be punctured or damaged like the customary pneumatic tires.

Special objects of my invention are to simplify and cheapen the construction and to render more efficient, serviceable, and durable in operation tires of the kind referred to.

With these ends in view the invention consists in the novel combination, arrangement, and adaptation of parts, all as more fully hereinafter explained, shown in the accompanying drawings, and then specifically set out in the appended claims.

In the annexed drawings I have shown a tire according to the principle of my invention.

Figure 1:
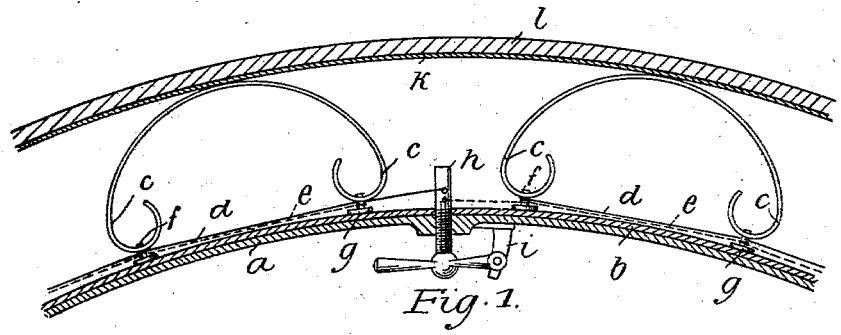
Figure 2:
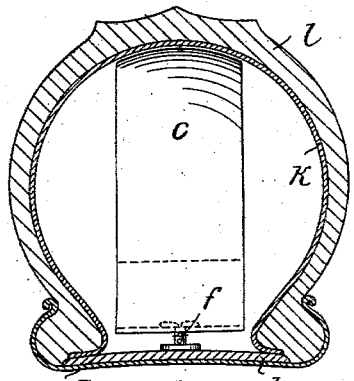
Figure 3:
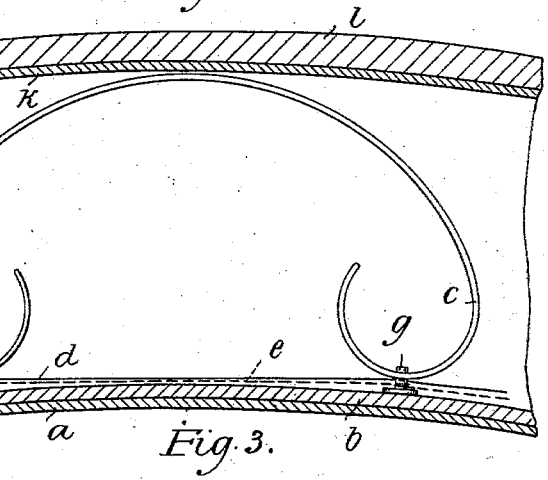

Figure 1 illustrates a portion of the tire in vertical section. Fig. 2 shows a transverse section through Fig. 1. Fig. 3 shows, on an enlarged scale, one of the springs with the tensioning means.

My improved tire is essentially composed of the rim $a$, of the customary shape and construction, upon which may be placed a leather band $b$ or the like, and of the springs $c$. The springs $c$ have their ends curled inwardly. Wires $d\ e$, running around the rim $a$, are attached to the curled ends of the spring $c$ by means of studs $f\ g$. To distinguish these two wires from one another in the drawings, one of them is shown in dotted lines. The studs $f\ g$ are alternately secured to the wires—that is to say, the first stud—let us assume $f$, according to Fig. 1, holding one end of the spring $c$, is fastened to the upper wire $d$, whereas the second stud, $g$, holding the second end of the spring $c$, allows the free passage of the upper wire $d$ through a hole in its stem, but is secured to the lower wire $e$. The next stud $f$ of the adjacent spring $c$ is analogously secured, and so on all around the tire.

The extremities of the wires $d\ e$ are secured to a bolt $h$, turnable in the rim $a$ in a manner similar to the spring-pivots of a pianoforte. It has to be observed, however, that the wires $d\ e$ must be enabled to wind on the bolt $h$ in opposite directions, so that by turning the bolt $h$ both wires $d$ and $e$ are pulled around the rim $a$ in opposite directions. Thus by turning the tensioning-bolt $h$ the distances separating the studs $f\ g$, which hold the springs $c$, as stated above, can be varied—*i. e.*, shortened or lengthened—and in consequence the springs $c$ are tensioned or slackened. In order to secure the position of the tensioning-bolt $h$, I provide suitable means—such, for instance, as shown in Fig. 1—consisting in a snap-hook.

In order to bridge the tensioned springs $c$ at their external curvatures and prevent injury of the external tire, I may place parallel with the rim $a$ a band-spring $k$ on same. This spring $k$ can show the tendency to coil up similar to watch-springs, so that it automatically lies tightly on the back of the springs $c$. Obviously the extremities of the spring $k$ must be placed so as to slide one upon the other. To this end I may provide a slot in one extremity and a stud engaging the aforesaid slot in the second extremity.

An ordinary tire $l$, of suitable known material, is placed either directly on the springs $c$ or over the band-spring $k$, if such is employed, and secured in position by suitable known means.

What I claim as my invention, and desire to secure by Letters Patent, is—

1. In a spring-tire for cycles and similar vehicles the combination, with the rim, of a turn-bolt, a pair of tensioning-wires, alternately attached to the inwardly-curled ends of the springs, running around the rim and having their free extremities attached to the aforesaid turn-bolt so as to wind on the latter in opposite directions, substantially as described and shown and for the purpose set forth.

2. In a tire the combination of the rim; a plurality of springs having inwardly-curled ends, a pair of tensioning-wires alternately attached to the aforesaid springs, a turn-bolt in the rim holding the free extremities of the tensioning-wires adapted to wind these wires in opposite directions; and an outer tire, substantially as described and shown, and for the purpose set forth.

3. In a tire the combination of the rim; a plurality of springs having inwardly-curled ends; a pair of tensioning-wires alternately attached to the aforesaid springs, studs fastened to the curled ends of the springs serving to attach the latter to the tensioning-wires; a turn-bolt in the rim holding the free extremities of the tensioning-wires adapted to wind these wires in opposite directions; and an outer tire, substantially as described and shown, and for the purpose set forth.

4. In combination with a spring-tire composed of a rim; a plurality of springs having inwardly-curled ends; tensioning means for the springs and an outer tire; a stud serving to alternately attach the tensioning-wires to the springs, said stud sliding with its base on the inner surface of the rim; holes in its stem allowing the passage of the tensioning-wires, one of which is suitably secured to the stem; and a folding head of the stud penetrating and holding the curled ends of the springs substantially as described and shown, and for the purpose set forth.

In witness whereof I have hereunto signed my name this 4th day of March, 1903, in the presence of two subscribing witnesses.

ADOLF SCHWIEGER.

Witnesses:
LEONORE RASCH,
C. C. STEVENSON.